Nov. 20, 1962  F. J. AGES  3,064,900
MANIFOLD VALVE
Filed Aug. 26, 1959  3 Sheets-Sheet 1

INVENTOR.
FREDERIK J. AGES
BY
Alan M. Staubly
ATTORNEY

Nov. 20, 1962   F. J. AGES   3,064,900
MANIFOLD VALVE
Filed Aug. 26, 1959   3 Sheets-Sheet 2

INVENTOR.
FREDERIK J. AGES
BY
*Alan M. Stanley*
ATTORNEY

Nov. 20, 1962  F. J. AGES  3,064,900
MANIFOLD VALVE
Filed Aug. 26, 1959  3 Sheets-Sheet 3

INVENTOR.
FREDERIK J. AGES
BY
*Glen M. Staubly*
ATTORNEY

United States Patent Office 3,064,900
Patented Nov. 20, 1962

3,064,900
MANIFOLD VALVE
Frederik J. Ages, Rolling Hills Estates, Calif., assignor to Minneapolis-Honeywell Regulator Company, Minneapolis, Minn., a corporation of Delaware
Filed Aug. 26, 1959, Ser. No. 836,189
7 Claims. (Cl. 236—1)

This invention relates to manifold valves particularly adapted for use in the control of gas in heating systems. More particularly, the invention is directed to a modulating type of diaphragm valve in combination with a manually operable plug valve and safety valve.

There have been many attempts in the prior art to provide valves for heating systems which provide a step opening and modulating control of the gas to a gas burner which, upon a call for heat, causes an initial minimum flow of gas for ignition purposes followed by modulation of the gas between the minimum flow in fuel on positions in accordance with heat demand. These prior art controls have been of extremely expensive construction and have failed to provide reliable operation.

It is one of the objects of this invention to provide a comparatively simple and inexpensive valve which operates in the above mentioned manner in a reliable and satisfactory way.

Another object of the invention is to provide a modulating type of gas valve in combination with a manual and safety valve.

A further object of the invention is to provide a compact diaphragm valve having a diaphragm controller valve in combination with a pressure regulator valve for providing a regulated gas pressure to the diaphragm through the diaphragm controller valve.

Another object of the invention is to provide a diaphragm valve in combination with a manually operable control valve having main and pilot burner ports therein wherein means is provided to selectively bleed off control gas from the diaphragm valve through a separate line to a bleed burner or to the outlet to the pilot burner.

Still further objects of the invention will become apparent upon reading the following detailed description of the invention in conjuntion with the accompanying drawings wherein:

FIGURE 1 of the drawing is an elevational view of the manifold valve with portions thereof shown in vertical cross section along the longitudinal axis thereof and other portions thereof broken away;

Figure 1:
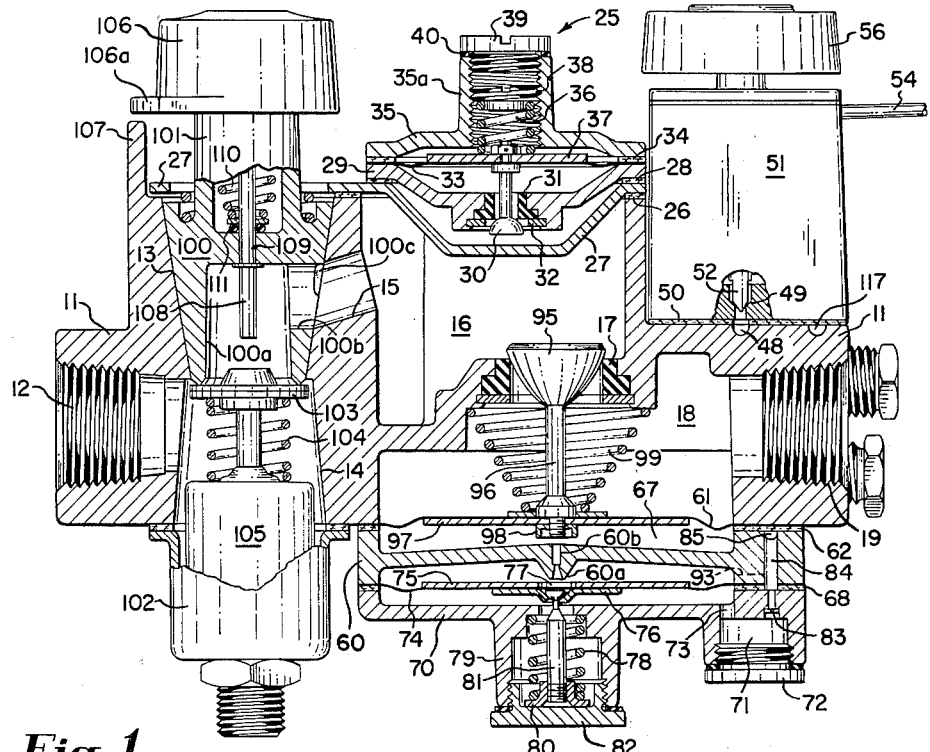
Figure 2:
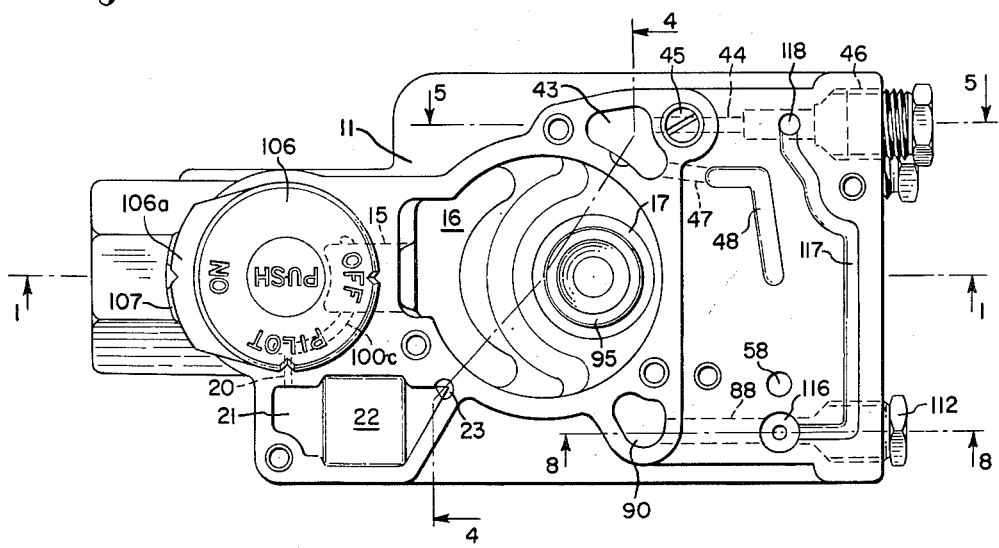
FIGURE 2 is a plan view of the valve with the pressure regulator and diaphragm controller valves removed.
Figure 3:
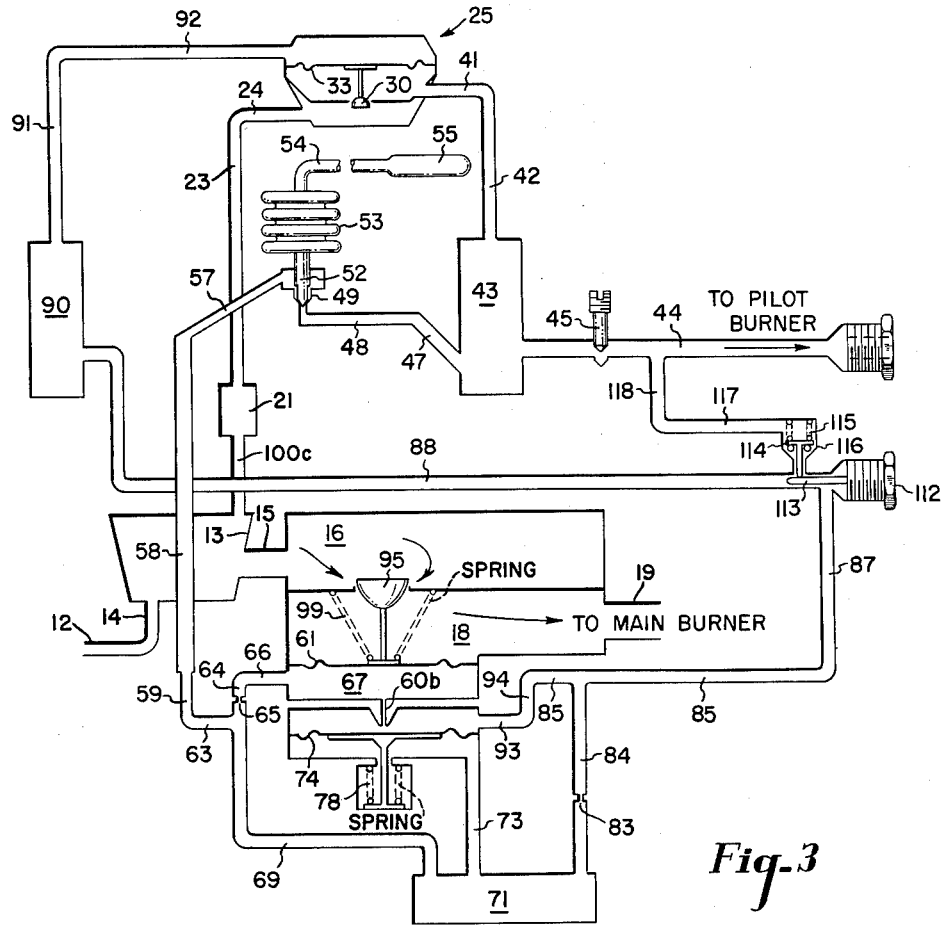
FIGURE 3 is a schematic drawing of the valve showing the flow passages through the various parts of the diaphragm valve portion of the manifold valve.
Figure 4:
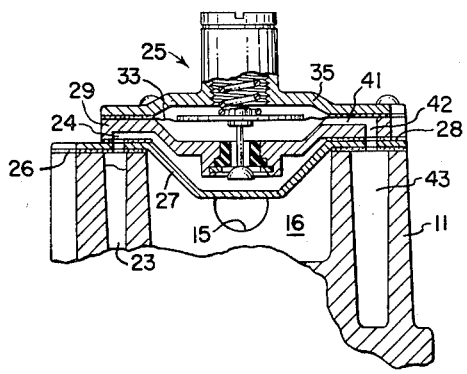
FIGURE 4 is a fragmentary sectional view taken along the line 4—4 of FIGURE 2.
Figure 5:
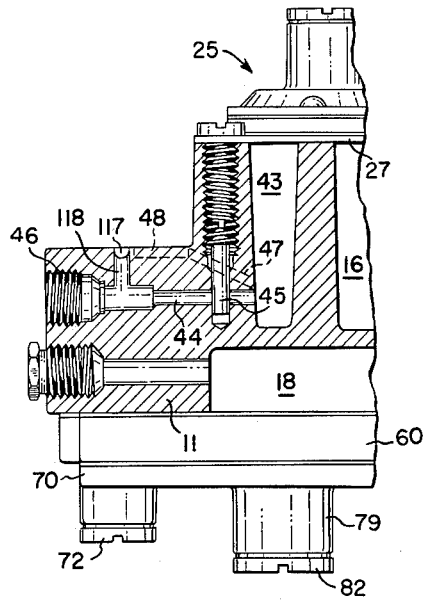
FIGURE 5 is a fragmentary sectional view taken along line 5—5 of FIGURE 2.
Figure 6:
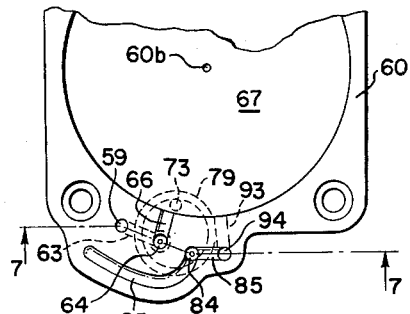
FIGURE 6 is a fragmentary view of the top of the cover plate for the diaphragm valve as viewed in FIGURE 1 of the drawing and is taken along line 6—6 of FIGURE 7.

Referring now to FIGURE 1 of the drawing, the manifold valve is generally designated by the reference numeral 11 and has a threaded inlet 12, a pair of axially aligned conical bores 13 and 14 comunicating with the inlet 12, a main gas passage 15 leading from the bore 13 to a chamber 16, a valve seat 17 between the chamber 16 and another chamber 18 and a threaded outlet 19 communicating with the chamber 18. Also provided in the valve body 11 is a secondary gas flow passage 20 (see FIGURE 2) leading from the bore 13 to a chamber 21, in which is located a filter 22. A vertical bore 23 leads from the chamber 21 to the top surface of the valve body 11 for registration with an inlet 24 of the pressure regulator 25 through holes in a gasket 26, a partition plate 27 and a second gasket 28 (see FIGURE 4).

The plate 27 seals the top of the chamber 16 and provides, with the bottom plate 29 of the pressure regulator, an inlet chamber below a pressure regulator valve 30 cooperable with a valve seat 31 secured in an opening through the plate 29 by means of a retaining washer 32. The valve 30 is secured to a diaphragm 33 which has its marginal edge clamped to the periphery of the plate 29 by means of a washer 34 and top plate 35. A compression spring 36 bears against a backing plate 37 for the diaphragm 33 and against an adjustable plug 38 in the threaded stack 35A of the cover plate 35. A sealing plug 39 has a washer 40 between it and the top of the stack 35A to close this stack.

Gas leads from the chamber under the diaphragm 33 through a radial groove 41 in the plate 29 to a vertical bore 42 therein in alignment with holes in the washers 28 and 26 and plate 27 to establish communication between the pressure regulator and a cavity 43 formed in the body 11. From the cavity 43 gas will pass through a bore 44 past a manually adjustable pilot gas valve 45 to a threaded outlet 46 adapted to be connected to a pilot burner, preferably of the atmospheric type.

Gas also is adapted to flow from the cavity 43 through a bore 47 (see FIGURE 2) to a groove 48 in the top surface of the body 11 over the outlet end of the body to register with the inlet 49 through a hole in a gasket 50 positioned between the top of the body 11 and a diaphragm controller valve 51.

The flow of gas through the controller valve 51 is regulated by a modulating valve 52 cooperating with the upper end of the inlet 49 in response to movement by the free end of a bellows 53 connected through a capillary tube 54 to a temperature sensitive bulb 55. The fixed end of the bellows 53 is adjustable by means of a control knob 56 in a conventional manner. The outlet passage 57 from the control valve 51 communicates with a vertical bore 58 in the valve body 11 which, in turn, communicates with a vertical bore 59 in a partition plate 60 through holes in the diaphragm 61 of the main valve and a gasket 62. The bore 59 communicates with a groove 63 formed in the bottom surface of the plate 60 which terminates in a stepped bore 64. An orifice plate 65 is positioned against a shoulder in the stepped bore 64 to provide regulated gas flow through the stepped bore 64 to a groove 66 in the top surface of the plate 60 which terminates in a pressure chamber 67 formed between the diaphragm 61 and the plate 60.

Thus far structure has been described which provides for the flow of regulated gas to the pressure chamber for the diaphragm valve. Gas is also adapted to flow from the groove 63 through a hole in a gasket 68 and diaphragm 74 to a vertical bore 69 (see FIGURE 7) in the bottom plate 70 to a chamber 71 closed by a threaded plug 72. From the chamber 71, gas is adapted to flow through a passage 73 (see FIGURE 1) to the bottom side of a diaphragm 74. The diaphragm 74 is clamped between two plates 75 and 76 which are secured together by means of rivets (not shown). The plate 75 has an aperture 77 therein of larger diameter than a valve seat boss 60A extending downwardly from the center of the plate 60 and having a bore 60B therethrough. The diaphragm 74 is movable into engagement with the valve seat 60A when pressure builds up below the diaphragm 74 to overcome the bias of a compression spring 78 located in a stack 79. The spring bears against a hexagonal adjusting nut threaded on the outer end of a stem 81 which is connected at its inner end to the plate 76 by means of a rounded head portion resting in a socket formed in the center of plate 76. A sealing plug 82 closes the end of the stack 79.

Figure 8:
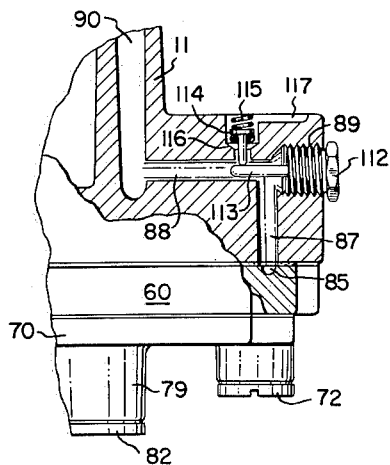
FIGURE 8 is a fragmentary side view of the manifold valve with a portion thereof broken away to show the adaptor valve that provides selective bleed passages for the control gas.
Figure 7:
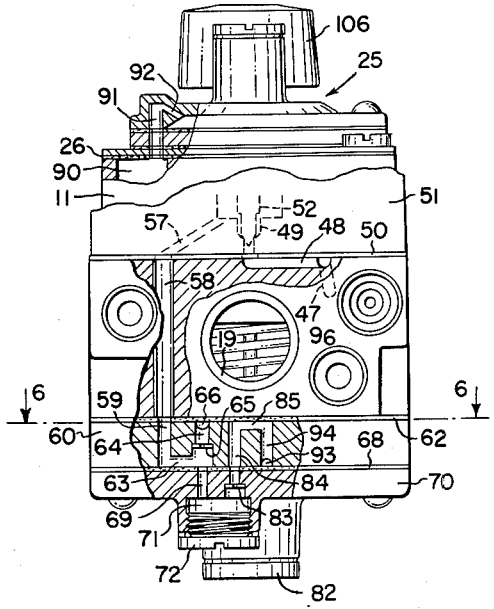
FIGURE 7 is an end elevational view of the manifold valve with portions in cross section taken along line 7—7 of FIGURE 6.

Gas is adapted to bleed from the chamber 71 through an orifice plate 83 and through holes in the gasket 68 and diaphragm 74 to a vertical bore 84 to a groove 85 formed in the top surface of the plate 60, as viewed in FIGURES 1 and 7 of the drawing. The groove 85 establishes communication between the bore 84 and a second vertical bore 94. Gas is adapted to flow to groove 85 which leads to a vertical bore 87 (see FIGURE 8) which, in turn, communicates with a transverse bore 88 that terminates in a threaded outlet 89 adapted to be connected to a conduit leading to a bleed burner (not shown) adjacent a pilot burner (not shown). The inner end of the bore 88 terminates in a cavity 90 formed in the valve body 11 which extends downwardly from the top surface thereof. The cavity 90 connects with the chamber above the diaphragm 33 of the pressure regulator through bores 91 and 92. This passage arrangement provides for the bleeding of gas from the chambers below the diaphragm 74 and from above the diaphragm 33. Gas also can bleed from the chamber above the diaphragm 74 through the horizontally extending groove 93 to a vertically extending bore 94 to also communicate with the groove 85 formed in the plate 60.

From the description of the arrangements of the control gas passages leading to the pressure chambers from the control valve and from the pressure chambers to the bleed ports, it can be seen that upon the opening of the control valve 52 gas will flow through an orifice 65 to the pressure chamber 67 of the diaphragm 61 and simultaneously will flow through an orifice 83 to a bleed outlet. Gas will also flow simultaneously from the control valve freely to the chamber below the diaphragm 74 so that pressure will build up in that chamber. Since the chamber above the diaphragm 74 is connected without restriction to the bleed outlet and as the chamber 67 is in communication through the passage 60B to the chamber above the diaphragm 74, pressure in chamber 67 will remain atmospheric until the pressure in the chamber below the diaphragm 74 builds up sufficiently to overcome the spring 78 and close the passage 60B.

The diaphragm 61 is secured to the main gas regulator valve 95 by a stem 96 which has a threaded portion extending through the diaphragm 61 and a backing plate 97 and is clamped thereto by means of a nut 98. A helical compression spring 99 normally biases the valve 95 against the valve seat 17.

In order to provide for manual cutoff of the gas flow through the manifold valve, a plug valve 100 of conventional construction is positioned in the conical bore 13. It is retained in this bore by means of a compression spring surrounding the hollow valve stem 101 extending upwardly from the plug valve and bearing at its lower end against the plug valve and at its upper end against the underside of the partition plate 27. The plug valve has an axial bore 100A extending upwardly from the bottom thereof and a radial bore 100B extending from the bore 100A to the outer surface of the plug in alignment with the bore 15 in the valve body. An arcuate groove 100C (see FIGURE 2) extends from the bore 100B approximately one-fourth of the distance around the plug valve so as to establish communications between the inlet 12 through the plug valve to the secondary passage 20 when the plug valve is in its "on" position. In the pilot position of the plug valve, the bore 100B will be in alignment with the passage 20.

To provide 100% safety shutoff of the gas whenever the pilot burner to which the valve is connected becomes extinguished, a thermocouple energized, electromagnetically controlled, safety valve 102 is secured over the outer end of the bore 14 to close said bore. This valve comprises a disc valve 103 normally biased into seating engagement over the lower end of the plug valve 100 by means of a compression spring 104. A conventional electromagnetic unit 105 is adapted to hold the valve 103 in its open position when it is energized but is incapable of moving the valve to its open position.

To provide for safety starting of the heating system to which the valve is connected, the plug valve carries on the upper end of its stem 101 a control knob 106 which is axially slideable but non-rotatable on the stem. The knob has a radially extending shoulder member 106A that extends over an upwardly extending boss 107 formed on the valve body 11 so that the plug valve may not slide axially into the valve stem when the plug valve is in its "on" position. When the knob 106 is in either the "pilot" or "off" position, the knob is free to move axially to provide opening of the disc valve 103 by means of a rod 108 extending from the knob 106 through the stem 101, through a bore 109 and into the bore 100A to a position closely adjacent the valve 103 when the valve is in its closed position. The knob 106 is normally biased outwardly with respect to the plug valve by means of a compression spring 110 bearing at its inner end against sealing washer 111 and at its outer end against the knob 106. When the plug valve is in its pilot position, inward movement of the knob 106 will cause the stem 108 to engage the valve 103 and move it to its open position with the armature (not shown) position in engagement with the core of the magnet (not shown) in a conventional manner.

To enable the use of only one conduit from the manifold valve other than the main gas conduit, the bleed line 88 may be closed by means of a threaded plug 112 screw threaded into the threaded bleed outlet 89 and carrying at its inner end a stem extension 113 which is adapted to cam a check valve 114 to an open position against the bias of a compression spring 115. The check valve is positioned in a stepped bore 116 extending from the upper surface of the valve body 11 to the bore 88. The bore 116 communicates through a groove 117 (see FIGURE 2) with a vertical bore 118 terminated at its lower end in the bore 44 leading to the pilot burner outlet. It is thus seen that if it is desired, a single conduit extending from the pilot burner outlet can also dispose of the bleed gas from the diaphragm valve, particularly if the pilot burner is of the atmospheric type. When using a non-atmospheric pilot burner, a separate bleed conduit from the valve to a separate bleed burner is required. This would mean removal of the plug 112, causing the closing of valve 114 and the connection of a bleed conduit to the outlet 89.

*Operation*

The manifold valve is illustrated as being in a safety shut-down position, that is, with the safety valve 103 closed and the plug valve in its "on" position. Under these circumstances, all gas flow to the main burner, the pilot burner and the diaphragm valve and its control valve is shut off.

To place the valve in operation, assuming it is installed in a heating system, the knob 106 is rotated to the pilot position and then moved inwardly to open the safety valve. The pilot burner may then be ignited, inasmuch as gas will flow from the inlet 12 past the safety valve, through the plug valve and through the arcuate groove 100C to the secondary passage 20, from which it is free to flow through the above described passages to the pilot burner. Once the pilot has been burning sufficiently to heat a thermocouple associated therewith to provide sufficient energization of the electromagnet 105, the knob 106 may be released to return to its outer position and the plug valve then moved to its "on" position.

Upon a drop in temperature around the bulb 55 of the controller valve 51, gas will flow from the outlet of the pressure regulator 25 through the control valve 51 to the pressure chamber 67 below the diaphragm 61 and on both sides of the diaphragm 74. The initial pressure supplied to the diaphragm chambers will be insufficient to cause movement of the diaphragm 61 to open the valve 95 against the bias of spring 99 due to the fact that as fast as the gas enters the chamber 67 through the orifice 65, it bleeds out through passage 60B to the bleed outlet. When valve 51 gradually opens, pressure will build up in the chamber below diaphragm 74 until this pressure is sufficient to move diaphragm 77 to close off bleed passage 60B, which allows bleed gas to escape only via orifice 83. This causes a rapid pressure increase in chamber 67 and will quickly open valve 95 to minimum flow rate. This assures that the main valve 95 will not open until there is sufficient pressure in the outlet from the control valve 52 as to cause quick opening of the valve 95 to a minimum flow position, to assure proper ignition of the main gas. The valve 95 will then modulate between the minimum flow position and the full open position thereof in response to the further opening and closing movements of the control valve 52.

As the temperature sensing portion of the control valve 51 approaches a satisfied condition, the main valve 95 will move to the minimum flow position whereupon any further movement of the valve 52 towards a closed position will cause sufficient reduction in pressure in the chamber below the diaphragm 74 as to enable the spring 78 to move the diaphragm 74 out of engagement with the seat 60a and thus cause quick bleeding of gas from the diaphragm chamber 67 to cause quick cutoff of gas flow past the valve 95. This assures proper cutoff of the main gas burner.

Should it be desired to cut off the flow of gas to the main burner manually, all that is necessary is to rotate the plug valve to its "off" position.

While I have described the preferred embodiment of the invention and its operation, it is deemed to be obvious that modifications may be made in the various components thereof without departing from the spirit of the invention. Therefore, the scope of the invention should be determined from the appended claims.

I claim as my invention:

1. A manifold gas valve comprising a valve body having a main inlet, a main outlet, a second outlet for connection to a pilot burner and a third outlet for connection to the atmosphere; a valve seat between said main inlet and said main outlet; a pressure motor operated valve cooperable with said seat for controlling the flow of gas therethrough; means for controlling the flow of gas from said inlet to the pressure motor of said valve; means for bleeding gas from said pressure motor to said third outlet; a passage between said third outlet and said second outlet; biased closed valve means in said passage; and means for closing said third outlet and opening said valve means.

2. The combination comprising a valve body having an inlet and an outlet and a flow passage therebetween, a safety valve in said passage adjacent said inlet, a manually operable valve downstream of said safety valve, a pressure operated valve downstream of said manually operable valve and having an open-top inlet chamber at one side thereof and a pressure chamber at the other side thereof, a secondary passage leading from said manually operable valve, a pressure regulator valve in said secondary passage and positioned over said open-top inlet chamber to seal said chamber, a pilot gas passage extending from said secondary passage downstream of said pressure regulator valve to the exterior of said valve body, flow regulating means in said pilot gas passage, a control gas passage leading from said secondary passage downstream of said pressure regulator valve to said pressure operated valve, a condition responsive modulating control valve in said control gas passage, means for bleeding gas from said pressure chamber, and means for selectively directing gas from said last mentioned means to either the pilot gas passage or the atmosphere.

3. The combination defined in claim 2 wherein the axes of said manual and safety valves are coaxial and are parallel to the axes of said pressure operated valve and said pressure regulator valve so as to provide a compact valve assembly.

4. A manifold gas valve comprising a valve body having a main inlet, a main outlet and a first passage therebetween, a second outlet for connection to an atmospheric type pilot burner, a second passage between said inlet and said second outlet, a valve seat in said first passage between said main inlet and said main outlet, a pressure motor operated main valve co-operable with said seat, a pressure regulator located in said second passage, means for controlling flow of gas from said pressure regulator to said pressure motor, means for bleeding gas from said pressure motor to a third outlet, a third passage extending from said third outlet to said second outlet, and valve means at said third passage and said third outlet for selectively closing said third outlet and opening said third passage or closing said third passage and opening said third outlet.

5. A manifold gas valve comprising a valve body having an inlet and an outlet and a flow passage therebetween, a safety valve in said passage adjacent said inlet, a manually operable valve downstream of said safety valve and arranged coaxially therewith, a pressure operated valve in an open-top chamber downstream of said manually operable valve and parallel therewith, a secondary passage leading from said manually operable valve, a pressure regulator valve subassembly connected into said secondary passage and located over and sealing said open-top chamber, a pilot gas passage extending from said secondary passage downstream of said pressure regulator valve, flow regulating means in said pilot gas passage, a control gas passage leading from said secondary passage downstream of said pressure regulator valve to said pressure operated valve, a condition responsive modulating control valve in said control gas passage and located partially over said pressure operated valve, a bleed passage extending from said control gas passage at said pressure operated valve to a bleed outlet at the exterior of said valve body, a first flow metering means between said control gas passage and said pressure operated valve, a second flow metering means in said bleed passage, a connecting passage leading from adjacent said bleed outlet to said pilot gas passage, and valve means for selectively opening said bleed outlet and closing said connecting passage or closing said outlet and opening said connecting passage.

6. In a manifold gas valve having a valve body with an inlet and an outlet and a flow passage therebetween, the combination comprising a safety valve in said passage adjacent said inlet, a manually operable valve downstream of said safety valve, a pressure operated valve downstream of said manually operable valve, a secondary passage leading from said manually operable valve, a pressure regulator valve in said secondary passage, a pilot burner outlet, a pilot gas passage extending from said secondary passage downstream of said pressure regulator valve to said pilot burner outlet, flow regulating means in said pilot gas passage, a control gas passage leading from said secondary passage downstream of said pressure regulator valve to said pressure operated valve, a condition responsive modulating control valve in said control gas passage, a bleed passage extending from said control gas passage at said pressure operated valve to said pilot gas passage downstream of said flow regulating means, a first flow metering means between said control gas passage and said pressure operated valve, and a second flow metering means in said bleed passage, a bleed outlet connected to said bleed passage, and valve means for selectively closing said bleed outlet and establishing communication between said bleed passage and said pilot gas passage or breaking communication between said bleed and pilot gas passages and opening said bleed outlet.

7. A valve as described in claim 6 wherein said valve means comprises a check valve and a plug having an extension thereon for sealing the bleed outlet and opening said check valve when said plug is positioned in said bleed outlet.

References Cited in the file of this patent

UNITED STATES PATENTS

| | | |
|---|---|---|
| 2,504,964 | Cunningham | Apr. 25, 1950 |
| 2,515,229 | Jenkins | July 18, 1950 |
| 2,524,377 | Cunningham | Oct. 3, 1950 |
| 2,599,457 | Jones | June 3, 1952 |
| 2,676,757 | Thornberry | Apr. 27, 1954 |
| 2,746,534 | Brooks et al. | May 22, 1956 |

FOREIGN PATENTS

| | | |
|---|---|---|
| 475,773 | Great Britain | Nov. 25, 1937 |
| 829,586 | Germany | Jan. 28, 1952 |